United States Patent [19]

Martin et al.

[11] Patent Number: 4,682,033
[45] Date of Patent: Jul. 21, 1987

[54] CAMERA FOR DETECTING X AND γ RAYS, WHOSE SCINTILLATION BLOCK HAS AN ENTRANCE WINDOW CONSTITUTED BY A MECHANICALLY STIFF AND LOW ABSORBING X AND γ RADIATION SUPPORT

[75] Inventors: Guy N. Martin, Noiseau; Michel R. Jatteau, Lesigny, both of France

[73] Assignee: U.S. Philips Corporation, New York, N.Y.

[21] Appl. No.: 750,620

[22] Filed: Jul. 1, 1985

[30] Foreign Application Priority Data

Jul. 6, 1984 [FR] France ................ 84 10786

[51] Int. Cl.⁴ ............................................. G01T 1/164
[52] U.S. Cl. .............................. 250/363 R; 250/363 S
[58] Field of Search ............... 250/368, 361 R, 363 R, 250/363 SR, 366

[56] References Cited

U.S. PATENT DOCUMENTS 3,011,057  11/1961  Anger ........................... 250/363 SR
3,937,969   2/1976  Muehllehner ................... 250/363 S
4,280,051   7/1981  Engdahl et al. ..................... 250/366

FOREIGN PATENT DOCUMENTS 147561  7/1985  European Pat. Off. ........ 250/361 R
 23273  2/1984  Japan .................................. 250/366

Primary Examiner—Carolyn E. Fields
Attorney, Agent, or Firm—Paul R. Miller

[57] ABSTRACT

A gamma camera (1), has a scintillation block with an entrance window (10) constituted by a mechanically stiff supporting structure which very slightly absorbs X and gamma rays. The entrance window (10) supporting the scintillation block (3) may be constituted by a honeycomb structure of a light material.

8 Claims, 7 Drawing Figures

CAMERA FOR DETECTING X AND γ RAYS, WHOSE SCINTILLATION BLOCK HAS AN ENTRANCE WINDOW CONSTITUTED BY A MECHANICALLY STIFF AND LOW ABSORBING X AND γ RADIATION SUPPORT

The invention relates to a camera for detecting X and γ rays, which can be used for picture display with a collimator, and comprises a scintillation block formed by a scintillation crystal, an entrance window and an optical exit window, the scintillation block cooperating with a light intensifier which is associated with a scintillation localizer, this scintillation localizer being connected to a signal measuring and display arrangement.

Such a camera is known from French Patent Specification No. 2,481,466 disclosing a scintillation camera comprising a scintillation block having an entrance window constituted by a thin sheet of, generally, aluminium and an optical exit window which is transparent for the light transmitted by the scintillations, a light intensifier, a scintillation localizer, a measuring and display arrangement.

The light intensifier is constituted by a mosaic of identical, independent modules, each having a parallel entrance face and a parallel exit face, these modules being juxtaposed and forming a plate with parallel faces, whose entrance face provided with photocathodes is optically coupled to the exit face of the scintillation crystal via the optical exit window of the scintillation block, which window is a thick glass window of considerable bulk, which ensures the mechanical strength of the scintillation crystal. The scintillation localizer is constituted by an array of photodetectors whose entrance faces are opposite the exit face of the light intensifier. The photodetectors convert the light transmitted by the intensifier into electric signals. Appropriate electronic circuits effect an adequate combination of the photo multiplier output signals for determining therefrom the energy of the radiation transmitted by the γ ray source and to derive therefrom the coordinate signals X and Y of the position of the scintillation in the scintillator from the source of γ rays which give rise to this scintillation, which signals are displayed on a screen.

In the design of the camera with intensifier, a tightest possible coupling is preferred between the exit face of the scintillation crystal and the entrance face of the light intensifier.

Put differently, the entrance face of the light intensifier block is contiguous to the optical exit window of the scintillation block. This window, which has a thickness of approximately 10 mms which is absolutely necessary for the mechanical strength of this scintillation block, limits the coupling of assemblies which must closely cooperate with the exit face of the scintillation crystal.

The invention has for its object to provide improvements to a camera whose optical exit window of the scintillation block, which window has a very small thickness, allows a very tight coupling between the output face of the scintillation crystal and the entrance face of the light intensifier, which improves the spatial and spectral resolutions of the camera.

The invention is characterized in that the scintillation block has an entrance window which is constituted by a mechanically stiff support and which absorbs X and γ radiations to a very small extent. Because of its very low absorption coefficient, such a structure does substantially not change the propagation of X and γ rays to the scintillation crystal. Its mechanical stiffness renders it possible to reduce the function of the optical exit window of the scintillation block to a very simple role of protecting the scintillation crystal, because of which the window is very thin, or further, renders it possible to omit said optical exit window for the case in which the scintillator is a non-hygroscopic crystal. In addition, the low weight of the entrance window enables a very easy handling of the scintillation block and the camera.

In a preferred embodiment, the supporting structure constituting the entrance window of the scintillation block is formed by at least one sheet, which is strengthened by a honeycomb structure, the structure being fastened perpendicularly to a face of said sheet. In this type of structure, the cells of the honeycomb have their longitudinal axis extending in the direction of propagation of the radiation creating the scintillations. Only the sheets perpendicularly to the longitudinal axis slightly effect the absorption of said radiations of the window. The stiffness of this structure permits the use of an adequately small thickness of the entrance window to ensure, when the camera is used, with a collimator, for picture display, its performances are not degraded, or are degraded to an negligible extent.

In a further preferred embodiment, the supporting structure constituting the entrance window of the scintillation block is formed by at least one sheet, which is mechanically stiffened by profiles forming projections, superimposing two or more of these sheets building the cells of a honeycomb. This structure makes it possible to realize a stiff support with thin sheets which, without profiles, would not have any mechanical strength.

In one embodiment the profiles form an undulating pattern.

More specifically, the cells of the honeycomb are filled with a hardenable material which is transparent for the X and γ radiations at the particular energy range used. Such a hardenable material, provided in the cells, makes it possible to increase the stiffness of the supporting window of the scintillation block and thus to reduce the thickness of the window. The hardenable material is selected on the basis of its physical properties which give it a quasi-transparency to the X and γ radiations.

The following description and the accompanying drawings illustrate the embodiments according to the invention.

Figure 1:
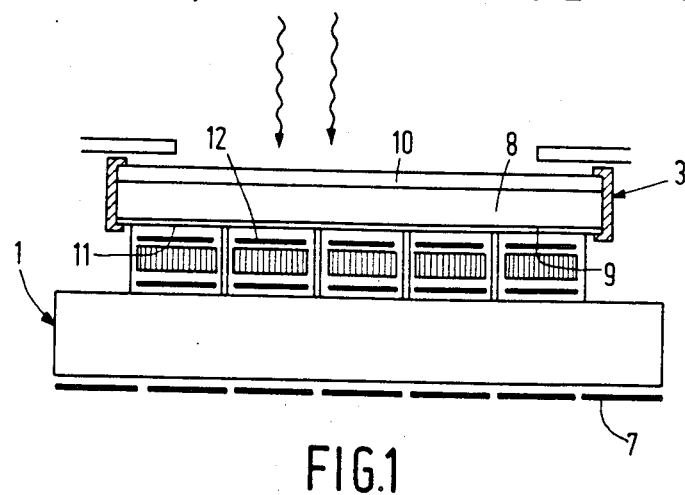
FIG. 1 shows a cross-sectional view of an embodiment of an improved camera.

FIG. 1 is a cross-sectional view through the improved camera 1, in which the scintillation block 3 formed from the scintillation crystal 8, the optical exit window 9 of the scintillation block and the mechanically stiff entrance window 10 is shown. The very thin window 9 is contiguous to the entrance face 11 of the light intensifier 12, which makes it possible for scintillation crystal 8 to cooperate closely with the intensifier 12. The array of photodetectors 7 constitutes the scintillation localiser.

Figures 2, 3:
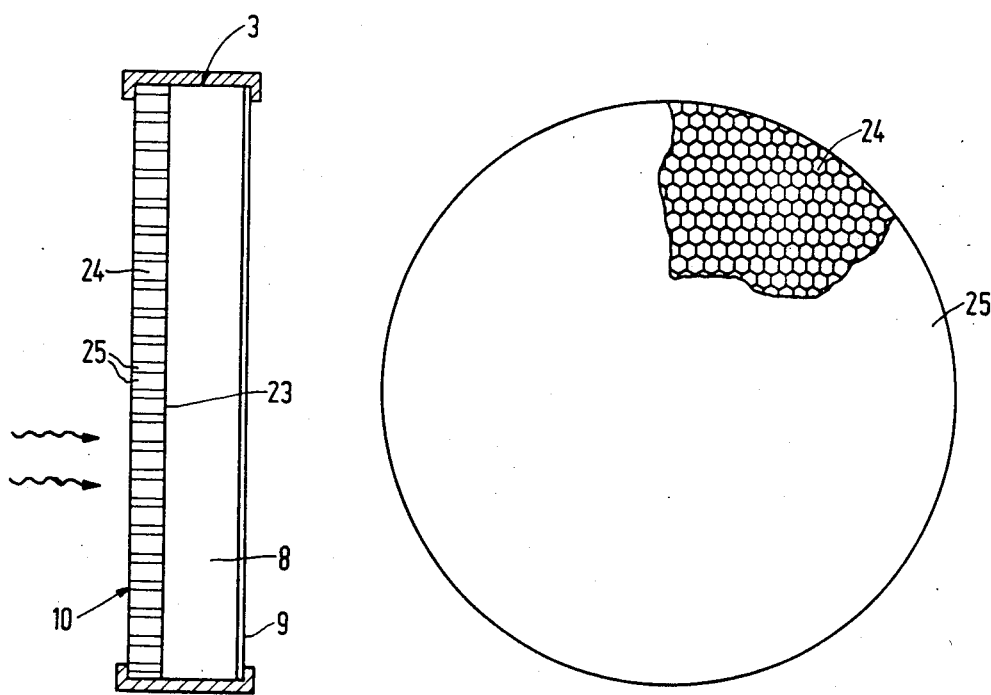
FIG. 2 shows a cross-sectional view through an embodiment of the scintillation block according to the invention.
FIG. 3 is a front view at the supporting entrance window side of the scintillation block of FIG. 2.

FIG. 2 is a cross-sectional view through a scintillation block 3, its scintillation crystal 8, its exit window 9 and an embodiment of the mechanically stiff structure of the entrance window 10 in accordance with the invention. In this embodiment, the window 10 is constituted by a thin sheet 23 which partially mates with the face of the crystal 8, which face is coated with a thin diffusing reflecting layer. The sheet 23 cooperates with a honeycomb structure 24 fastened to it. The longitudinal axes of the cells are perpendicular to the surface of the sheet 23 and thus ensure complete stiffness. A sheet 25 is preferably added by inserting the honeycomb structure 24 between the sheet 23 and sheet 25, thus still more improving the mechanical stiffness of the structure.

FIG. 3 shows the entrance window of the scintillation block with a partially cut-away sheet 25, so as to show the cells of the honeycomb structure 24. In this type of window the material used for the construction of the structure is of aluminum foil of approximately 0.1 mm thick or any other low-density material, with a low atomic number, that is to say a material which is quasi-transparent to the X and E radiations, it being necessary for the structure to have the lowest possible atomic absorption coefficient and a stiffness which enables the mechanical support of the scintillation crystal.

Figure 4:
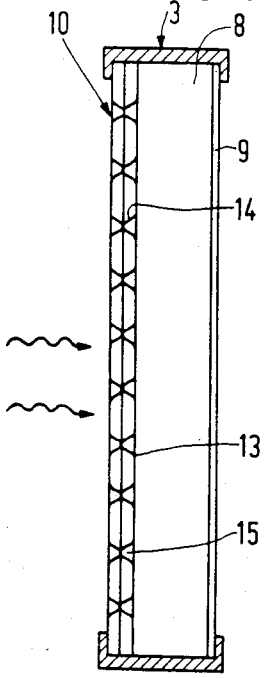
FIG. 4 is a cross-sectional view through a further embodiment of the scintillation block according to the invention.

FIG. 4 shows the scintillation block 3 in a cross-sectional view, its scintillation crystal 8, its optical exit window 9 and the mechanically stiff structure of the window 10. The window 10 is formed from at least one thin sheet 13 which partially mates with the face of the crystal 8, this sheet is stiffened mechanically by profiles 14 forming projections, the projections being of a substantially square shape in this embodiment. Superpositioning two or more sheets produces the cells 15 of a honeycomb structure.

Figure 5:
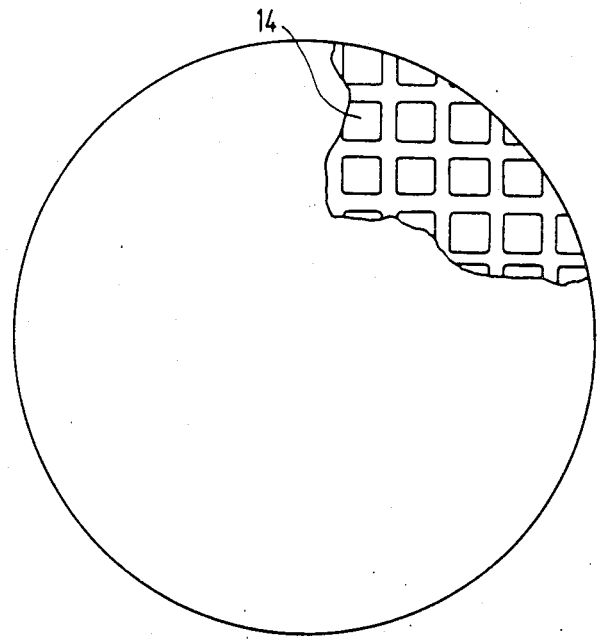
FIG. 5 is a front view at the supporting entrance window side of the scintillation block of FIG. 4.

FIG. 5 is a front view of the entrance window 10 of the scintillation block on which a portion of the profiles 14 are shown.

Figure 6:
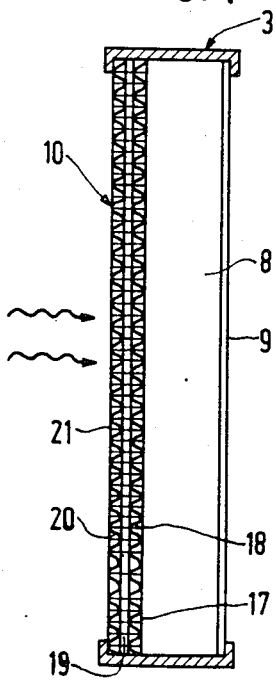
FIG. 6 is a cross-sectional view through a further embodiment of the scintillation block according to the invention.

FIG. 6 shows a section through the scintillation block 3 and a further embodiment of the structure of the entrance window 10. The entrance window 10 is constituted by a thin sheet 17 which partially mates with the face of the scintillation crystal 8 with the sheet 17 cooperating with a first corrugated portion 18 connected thereto and which gives a longitudinal mechanical stiffness to the corrugations 18. Preferably, a second undulating portion 19 is added, whose corrugations are positioned perpendicularly to the corrugations of the corrugated portion 18. Such a structure may be formed, as shown in the example of the Figure, of three corrugating portions 18, 19 and 20 and a substantially flat sheet 21 which terminates the structure.

Figure 7:
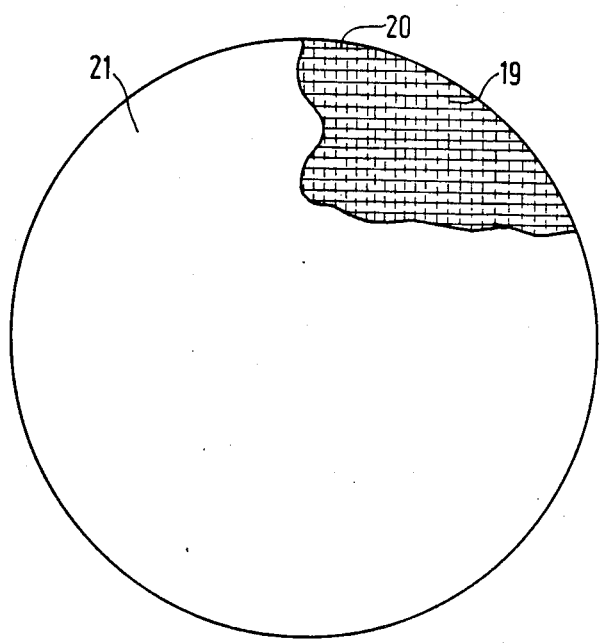
FIG. 7 is a front view at the supporting entrance window side of the scintillation block of FIG. 6.

FIG. 7 shows the entrance window of a scintillation block of which a portion of the sheet 21 has been removed to show the corrugated portion 20 and, below it by means of a dotted line, the corrugated portion 19. The materials used to produce a window may be aluminum foil or any other low-density laminated or solid material, as for example, carbon, boron composites, synthetic materials, composites of wood (cardboard), materials which provide a mechanical stiffness of the scintillation block.

The scintillation block described renders it possible because of its mechanically stiff support structure to provide the light intensifier on the exit face of the scintillation crystal and to thus improve the spatial and spectral resolutions of the camera.

When used in cameras of the Anger type comprising a much larger number of photo-multipliers of very small diameters than usual in contemporary cameras, and with a view to improving the performances, it is necessary to provide the entrance windows of the photo-multipliers near the exit face of the scintillation crystal. This implies the use of a scintillation block with a mechanically stiff supporting structure in accordance with the invention.

What is claimed is:

1. A scintillation camera comprising a scintillation block including a scintillation crystal, an entrance window and an optical exit window; light intensifying means for receiving signals from said scintillator block; and signal measuring and displaying means for providing measured signals the improvement comprising said entrance window of said scintillation block being a mechanically stiffened supporting structure having a low absorption for ionizing radiation, wherein said mechanically stiffened supporting structure includes a honeycomb structure attached to at least one sheet, said honeycomb structure being provided perpendicular to a face of said sheet.

2. A scintillation camera comprising a scintillation block including a scintillation crystal, an entrance window and an optical exit window; light intensifying means for receiving signals from said scintillator block; and signal measuring and displaying means for providing measured signals the improvement comprising said entrance window of said scintillation block being a mechanically stiffened supporting structure having a low absorption for ionizing radiation, wherein said mechanically stiffened supporting structure includes at least two sheets being mechanically strengthened by profile forming projections, and wherein said at least two sheets are superimposed to form a honeycomb structure.

3. A scintillation camera according to claim 2, wherein said projections are in the form of corrugations.

4. A scintillation camera according to claim 1 or claim 2, wherein said honeycomb structure has cells filled with a hardenable material, said hardenable material being partially transparent for said ionizing radiation.

5. A scintillation block comprising a scintillation crystal, an entrance window, and an optical exit window, the improvement comprising said entrance window being a mechanically stiffened supporting structure having a low absorption for ionizing radiation, wherein said mechanically stiffened supporting structure includes a honeycomb structure attached to at least one sheet, said honeycomb structure being provided perpendicular to a face of said sheet.

6. A scintillation block comprising a scintillation crystal, an entrance window, and an optical exit window, the improvement comprising said entrance window being a mechanically stiffened supporting structure having a low absorption for ionizing radiation, wherein said mechanically stiffened supporting structure includes at least two sheets being mechanically strengthened by profile forming projections, and wherein said at least two sheets are superimposed to form a honeycomb structure.

7. A scintillation block according to claim 6, wherein said projections are in the form of corrugations.

8. A scintillation block according to claim 5 or claim 6, wherein said honeycomb structure has cells filled with a hardenable material, said hardenable material being partially transparent for said ionizing radiation.

* * * * *